United States Patent
Youssef et al.

(10) Patent No.: US 10,093,280 B2
(45) Date of Patent: *Oct. 9, 2018

(54) METHOD OF CONTROLLING A CURSOR BY MEASUREMENTS OF THE ATTITUDE OF A POINTER AND POINTER IMPLEMENTING SAID METHOD

(71) Applicant: MOVEA, Grenoble (FR)

(72) Inventors: Joe Youssef, Grenoble (FR); Gregoire Aujay, Grenoble (FR)

(73) Assignee: Movea, Grenoble (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/926,113

(22) Filed: Oct. 29, 2015

(65) Prior Publication Data

US 2016/0077604 A1    Mar. 17, 2016

Related U.S. Application Data

(63) Continuation of application No. 14/342,590, filed as application No. PCT/EP2012/067156 on Sep. 4, 2012, now Pat. No. 9,201,513.

(30) Foreign Application Priority Data

Sep. 9, 2011 (FR) .................................. 11 58041

(51) Int. Cl.
    *B60S 1/38* (2006.01)
    *B60S 1/40* (2006.01)

(52) U.S. Cl.
    CPC ............... *B60S 1/3858* (2013.01); *B60S 1/38* (2013.01); *B60S 1/3808* (2013.01);
    (Continued)

(58) Field of Classification Search
CPC .... G06F 3/033; G06F 3/0346; G06F 3/04812; G06F 3/04815; G06F 3/0425;
(Continued)

(56) References Cited

U.S. PATENT DOCUMENTS 5,325,472 A * 6/1994 Horiuchi ................. G06T 15/20
                                                    345/419
5,440,326 A    8/1995 Quinn
(Continued)

FOREIGN PATENT DOCUMENTS

EP          2219101       8/2010
WO       2009/156499     12/2009
(Continued)

OTHER PUBLICATIONS

International Search Report and Written Opinion from PCT/EP2012/067156, dated Oct. 5, 2012.

*Primary Examiner* — Tom Sheng
(74) *Attorney, Agent, or Firm* — Baker & Hostetler LLP

(57) ABSTRACT

A system and method of controlling a cursor (120) in a surface (100) by measurements of attitude of a pointer (110). The measurements can be provided by inertial, optical, magnetic, ultrasound, radiofrequency or video means and appropriate processing means. The method includes a step of computing the displacements of the intersection of a vector tied to the pointer with a projection surface. The projection surface can be predetermined on the basis of the measurements of the attitude and/or of the angular velocity of the pointer. The pointed-at surfaces can be planes, cylinders or spheres. The pointing can be performed in limited fashion or by sliding. The control of the cursor, in absolute mode or in relative mode, can allow the triggering of functions controlled by the orientation of the cursor on the pointed-at surface.

19 Claims, 9 Drawing Sheets

(52) U.S. Cl.
CPC ........... *B60S 1/3853* (2013.01); *B60S 1/3856* (2013.01); *B60S 1/4019* (2013.01); *B60S 1/3877* (2013.01); *B60S 1/4006* (2013.01); *B60S 1/4009* (2013.01); *B60S 2001/4054* (2013.01)

(58) Field of Classification Search
CPC .......... G06T 7/004; B60S 1/3858; B60S 1/38; B60S 1/3808; B60S 1/3853; B60S 1/3856; B60S 1/4019; B60S 1/3877; B60S 1/4006; B60S 1/4009; B60S 2001/4054
See application file for complete search history.

(56) References Cited

U.S. PATENT DOCUMENTS

| | | | |
|---|---|---|---|
| 5,446,798 A * | 8/1995 | Morita | G06T 7/97 348/142 |
| 5,598,187 A | 1/1997 | Ide et al. | |
| 5,880,733 A * | 3/1999 | Horvitz | G06F 3/04815 345/427 |
| 6,577,330 B1 * | 6/2003 | Tsuda | G06F 3/04815 715/781 |
| 6,791,541 B1 * | 9/2004 | Czuchry, Sr. | G03B 35/24 345/419 |
| 7,102,616 B1 | 9/2006 | Sleator | |
| 7,158,118 B2 | 1/2007 | Liberty | |
| 7,643,025 B2 * | 1/2010 | Lange | G02B 27/22 345/419 |
| 7,683,883 B2 * | 3/2010 | Touma | G06F 3/0346 345/157 |
| 8,032,324 B1 * | 10/2011 | Bryant | G01C 17/02 702/141 |
| 8,094,131 B2 * | 1/2012 | Hung | G06F 3/011 178/18.01 |
| 8,289,316 B1 * | 10/2012 | Reisman | G06F 3/0425 345/173 |
| 8,593,456 B2 * | 11/2013 | Furuhashi | A63F 13/10 345/419 |
| 8,994,721 B2 * | 3/2015 | Matsuda | G06F 3/04815 345/419 |
| 9,201,513 B2 * | 12/2015 | Youssef | G06F 3/0346 |
| 2003/0048277 A1 * | 3/2003 | Maillot | G06T 11/001 345/582 |
| 2004/0070564 A1 * | 4/2004 | Dawson | H04N 21/422 345/156 |
| 2010/0020026 A1 * | 1/2010 | Benko | G06F 3/041 345/173 |
| 2010/0066734 A1 * | 3/2010 | Ohta | G06T 15/30 345/419 |
| 2010/0091038 A1 * | 4/2010 | Konno | G06F 3/0416 345/653 |
| 2012/0320053 A1 * | 12/2012 | Miyatani | G06T 7/75 345/420 |
| 2013/0162538 A1 * | 6/2013 | Ichieda | G06F 3/033 345/163 |

FOREIGN PATENT DOCUMENTS

| | | |
|---|---|---|
| WO | WO 2009/156476 A2 | 12/2009 |
| WO | WO 2010/007160 A1 | 1/2010 |

* cited by examiner

METHOD OF CONTROLLING A CURSOR BY MEASUREMENTS OF THE ATTITUDE OF A POINTER AND POINTER IMPLEMENTING SAID METHOD

CROSS-REFERENCE TO RELATED APPLICATIONS

This application is a continuation of U.S. patent application Ser. No. 14/342,590, filed Mar. 4, 2014, which is the national phase application under § 371 of International Patent Application No. PCT/EP2012/067156, filed Sep. 4, 2012, which claims priority to French Patent Application No. 1158041, filed Sep. 9, 2011. All of these applications are incorporated herein by reference.

FIELD OF THE INVENTION

Embodiments of the present invention concern a method of controlling movements and orientation of a cursor, on a display surface, for example a plane surface such as a television screen, a PC screen, etc. The control of the displacement of a cursor on a non-planar display surface of arbitrary shape is also possible through the method and the device of the invention. An assembly of coordinated flat screens can for example constitute a non-plane surface (sphere, cylinder, etc.). The display surface is endowed with a metric system of coordinates. A user equipped with a pointer instrumented with means for measuring motions and with control buttons can thus for example control, by way of the displacement in 3D space of the instrumented pointer, the displacement, and/or the position and/or the orientation of a cursor on a display surface which displays a graphical interface of one or more software applications. The control pointer can thus trigger the execution of programmed functions chosen through the position and/or the displacement and/or the orientation of the pointer and/or through the use of controls provided for this purpose on the pointer.

Devices of this nature are intended to substitute for remote controls in which the commands do not make it possible to continuously control a cursor on the display surface and consist, of a list of codes associated with the buttons pressed by the user which are transmitted to the equipment to be controlled via an infrared, or more recently radioelectric, link.

BACKGROUND

One of the first devices of this type was disclosed by U.S. Pat. No. 5,440,326. In this device, gyroscopes afford two measurements of angular velocities (in terms of pitch and yaw) which are converted into cursor commands in relation to two axes of the display surface. However, this type of device exhibits limitations in its ergonomics, since it is based only on the rate of rotation of the pointer in relation to 2 axes, measured in the frame of the pointer, and not on the orientation of the device in the display frame. For example, these measurements are sensitive to the orientation in which the pointer is held by the user (the $3^{rd}$ angle, roll or tilt, not measured). Indeed, when the user holds the remote control with an angle of twist of their wrist (called roll), will see the cursor move in an undesired direction. Moreover, the limitation to two measurement axes renders the use of the remote control complex for significant angles and the ergonomics of the pointing is then affected thereby.

To combat these effects, a stabilization of the measurements can be performed by mechanical means, the gyroscopes being mounted on gimbals. However, this mechanical stabilization is on the one hand limited to small angles of roll (mechanical stops) and is imperfect also because of the inertia of the gimbals. Furthermore, such a correction is not applicable to miniature devices.

These drawbacks may to some extent be overcome by devices in which the measurements of rate of rotation in yaw and pitch provided by miniature gyrometers are corrected for the angle of roll by the measurements of an accelerometer using a two-dimensional rotation matrix. Devices of this nature are notably disclosed by U.S. Pat. No. 5,598,187 (Ide) and U.S. Pat. No. 7,158,118 (Liberty). In devices of this nature, the various angles must actually be computed on the basis of the measurements of different sensors. In the international application published under No. WO2009/156476 (Mathews) belonging to the applicant of the present application, a correction is applied without prior computation of the angle of roll. The roll angle correction in fact relies on a principle which is fundamentally imperfect to the extent that the accelerometer is also sensitive to the acceleration due to the motion, thereby inevitably perturbing the estimation of the angle of roll and giving an inaccurate effect on the trajectory of the cursor on the display surface. Finally, certain orientations of the pointer (near vertical, for example) no longer make it possible to compute the angle of roll, since the latter is no longer measured by the accelerometer. The roll compensation function therefore introduces on this occasion defects which are not present initially in the ergonomics of the control of the cursor by motion.

A way of overcoming the drawback of separate estimation of the angles has been disclosed by the international application published under the No. WO2009/156499, one of the proprietors of which is the proprietor of the present application, in which an extended Kalman filter is applied to carry out joint estimation of the state variables by using a state model comprising a first-order differential equation. However, the implementation of this filtering is limited to a single mode of control of the movement of the cursor as a function of the movement of the pointer and is also greedy in terms of computationpower.

Patent application US2004/070564 discloses a device for pointing on a screen which computes the displacements of a cursor on said screen on the basis of the coordinates of the intersection of a vector carried by the pointer with the screen. U.S. Pat. No. 7,102,616 discloses a device for pointing on a screen instrumented with sources in communication with said pointer which computes the displacements of the pointer on the basis of the angular velocity of the pointer in the frame of the screen. None of these documents discloses modalities for projecting the position and/or the orientation of the pointer on the cursor which are parametrizable as a function of the applicational context.

SUMMARY OF THE INVENTION

Embodiments of the invention make it possible to overcome the drawbacks of this prior art by proposing a process for computing the displacements of a cursor in the display surface (or pointed-at surface) on the basis of pointer attitude measurements projected onto a chosen intermediate surface, distinct from the display surface and, optionally, not plane.

For this purpose, an embodiment of the invention affords a method of controlling first parameters characterizing a cursor on a display surface using a movable pointer moving in space, said first parameters being chosen from a group comprising displacements, position and orientation of said cursor, said method comprising a step of determining at least one second parameter of a frame tied to the pointer, said at least one second parameter being chosen from a group comprising attitude, position and angular velocity of said frame, a vector p being tied to said frame, said method being further comprising a step of computing said first parameters by using one or more intersections of a straight line carried by said vector p with a projection surface, said projection surface being predetermined and distinct from the display surface, said computation step receiving as input at least some of said second parameters.

Advantageously, at least some of the first parameters are computed by a step of describing the projection surface established by at least one position of a point belonging to the tangent plane to said surface at the point of intersection with this surface at the point of intersection considered.

Advantageously, the description of the projection surface varies as a function of the translation of the pointer or of the context.

Advantageously, the projection surface belongs to the group of plane surfaces, cylindrical surfaces and spherical surfaces.

Advantageously, the projection surface is a vertical plane surface and a first coordinate, respectively a first displacement, of the point is computed as being equal, save for a multiplicative constant, to the tangent of the angle of yaw of the pointer, respectively to the difference of the tangents of the angles of yaw of the pointer at the end and at the start of said displacement.

Advantageously, the projection surface is a vertical plane surface and a second coordinate, respectively a second displacement, of the point is computed as being equal, save for a multiplicative constant, to the ratio of the tangent of the angle of pitch to the cosine of the angle of yaw of the pointer, respectively to the difference of the ratios of the tangent of the angle of pitch to the cosine of the angle of yaw of the pointer at the end and at the start of said displacement.

Advantageously, the projection surface is a vertical cylindrical surface and a first coordinate, respectively a first displacement, of the point is computed as being equal, save for a multiplicative constant, to the angle of yaw of the pointer at a point of the surface, respectively to the difference of the angles of yaw of the pointer at the end and at the start of said displacement.

Advantageously, the projection surface is a vertical cylindrical surface and a second coordinate, respectively a second displacement, of the point is computed as being equal, save for a multiplicative constant, to the tangent of the angle of pitch of the pointer at a point of the surface, respectively to the difference of the tangents of the angles of pitch of the pointer at the end and at the start of said displacement.

Advantageously, the projection surface is a spherical surface centered on the pointer and a first coordinate, respectively a first displacement, of the point is computed as being equal, to within a multiplicative constant, to the angle of yaw multiplied by the cosine of the angle of pitch of the pointer at a point of the surface, respectively to the difference of the angles of yaw of the pointer at the end and at the start of said displacement, multiplied by the cosine of the angle of pitch at the start of the displacement.

Advantageously, the projection surface is a spherical surface centered on the pointer and a second coordinate, respectively a second displacement of the point is computed as being equal, to within a multiplicative constant, to the angle of pitch of the pointer at a point of the surface, respectively to the difference of the angles of pitch of the pointer at the end and at the start of said displacement.

Advantageously, the orientation of the cursor is computed by projecting, along p on said surface, a vector perpendicular to vector p.

Advantageously, the rotation of a vector perpendicular to p is computed by projecting the integral of the angular velocity along the axis of the pointer or based on its orientation.

Advantageously, the computation of at least some of the first parameters is performed based on the angular velocity of the pointer measured in the frame of the sensor and on the attitude.

Advantageously, the displacement of the cursor, having two components, is computed by projecting an angular velocity vector of the pointer, whose component along vector p tied to the pointer is set to zero, and transformed into the frame tied to the earth, onto the axes ($X_E$, $Y_E$) of the frame defining the elementary surface for the current position and orientation of the pointer, and multiplying by gain factors.

Advantageously, the displacement of the cursor, having two components, is computed by projecting an angular velocity vector of the pointer expressed in the terrestrial frame, onto the axes ($X_E$, $Y_E$) of the frame defining a plane elementary surface and taken perpendicular to the vector p defined by the pointer, and multiplying by gain factors Advantageously, the pointing is carried out in absolute mode.

Advantageously, the pointing is carried out in relative mode.

Advantageously, the pointing is carried out in relative mode in one direction and in absolute mode in another direction.

Embodiments of the invention also afford a system for controlling first parameters characterizing a cursor on a display surface using a pointer oriented in space toward said surface, said first parameters being chosen from a group comprising displacements, position and orientation of said cursor, said system comprising a module for determining second parameters of a frame tied to the pointer, said second parameters being chosen from a group comprising attitude, position and angular velocity of said frame; a vector p being tied to said frame, said system further comprising a module for computing said first parameters by using one or more intersections of a straight line carried by said vector p with a projection surface, said projection surface being predetermined and distinct from the display surface said computation module receiving as input at least some of said second parameters.

One of the advantages of various embodiments of the invention is that they can be implemented by using very diverse devices which provide measurements of attitude (or orientation) of the pointer.

Embodiments of the invention allow accommodating various principles of measurement of the movement of the pointer (or of the remote control) and provides the possibility of proposing various modes, for different ergonomic objectives and uses.

Moreover, various embodiments of the invention propose variants which allow taking into account devices which deliver the position parameters (translational) of the pointer in space. The cursor display parameters can be determined in terms of position (absolute mode) or of displacement (relative mode).

Furthermore, the pointing may or may not be limited to a restricted cone delimited by boundaries of the display surface, and therefore the cursor displacements limited to the display surface (control in limited/sliding mode). According to the invention, these embodiments, can be combined according to the applicational context and the available pointer position and orientation information.

BRIEF DESCRIPTION OF THE DRAWINGS

The various embodiments of the present invention will be better understood with the aid of the description which follows and of the appended drawings, in which.

DETAILED DESCRIPTION

Figure 1:
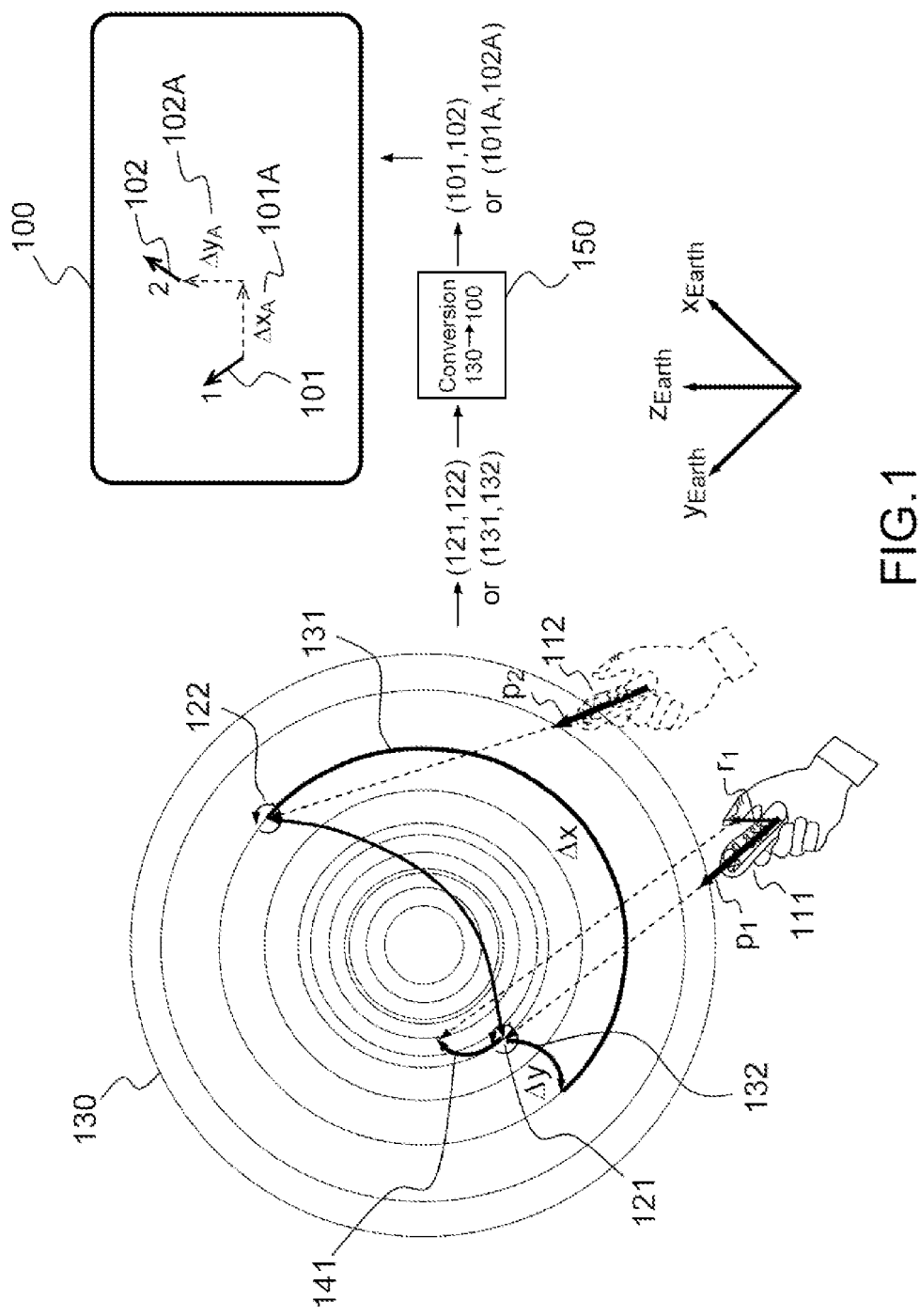
FIG. 1 represents a pointer held by a user with a view to controlling an oriented cursor on a display surface which is here a plane screen, and a projection surface with the various frames used in an embodiment of the invention.

FIG. 1 represents a pointer held by a user with a view to controlling the motion of a cursor on a display surface (100) which here is a screen with the various frames used in an embodiment of the invention.

The aim of various embodiments of the invention is to provide various procedures for determining the parameters of position or of displacement of the cursor 101, 102 in a screen 100 driven by a pointing device (or pointer) in terms of position 111 or 112, the attitude (or orientation) and/or the position of the pointer being known in a reference frame tied to the display surface which is generally the earth frame $(X_{Earth}, Y_{Earth}, Z_{Earth})$. The pointer is a tool carried by the user which is positioned and oriented by the user and which allows the latter to point in a direction, and the cursor is the marking of the pointing on an object/screen, or display surface.

To determine the position and the orientation of the cursor on the screen in accordance with the motions imparted to the pointer by the user, the principle of an embodiment of the invention introduces a surface of intermediate projection, 130, of the "pointing vector" $p_1$ (respectively $p_2$) carried by the pointer, 111 (respectively 112). Let us note that the projection surface 130 may coincide with the display surface or be different (as is illustrated in FIG. 1). The projection surface is described and known in the reference frame tied to the display surface. As indicated further on in the description, the choice of the projection surface is dependent on the application and can be chosen so as to obtain the most ergonomic rendition suited to the application. It can also change as a function of the context of use and it is also possible to use several models of surfaces of projection in relation to the components of the cursor. The choice of this projection surface also depends on the available information, out of the orientation and/or the position of the pointer in the reference frame.

Various embodiments of the invention utilize the data of orientation and/or of position of a movable pointer, given in a reference frame (or often terrestrial frame) to compute the position or the displacement or the orientation of a cursor on a display screen. This method makes it possible for example to reproduce the effect of displacement of a cursor generated by a laser pointer, while making it possible to drive an application, for example by contextual menus of the position or of the orientation of the cursor on the display surface. The choice of the projection surface makes it possible to modify the relation between the displacement of the movable pointer and the displacement of the cursor on the display surface. The reference frame is tied to the display surface. The display surface generally being fixed in the terrestrial frame, this reference frame therefore generally coincides with the terrestrial frame.

The movable pointer is mapped in the reference frame with the aid of measurement means. These means provide the orientation and/or the position of the pointer in this frame. For a better understanding of an embodiment of the invention, we propose to classify the measurement means into two categories. The first utilizes only means onboard the movable pointer. It is for example possible to cite inertial and magnetic motion sensors such as accelerometers, magnetometers, gyrometers which make it possible, by combination, to provide the orientation, or indeed the position of the pointer in the reference frame. The second category comprises means which require instrumentation fixed in the reference frame. For example, optical, magnetic or electromagnetic means, sound or ultrasound means, radio means make it possible to locate the movable pointer in terms of position and/or orientation in the reference frame and they require instrumentation of the reference frame.

The method can be applied when only the movable pointer orientation data are available, in which case, the position will be assumed to be defined in an arbitrary manner with respect to the projection surface. Likewise if only position data are known, it will be possible to assume that the orientation is known in an arbitrary manner. It is generally simpler and less expensive to instrument the pointer so as to obtain the measurements of its orientation; this is therefore one of the preferred modes of implementation for this embodiment of the invention. The position of the pointer is then defined in an arbitrary manner.

The frame of the movable pointer is endowed by a vector p which demarcates the direction of pointing. The pointing vector p is therefore generally defined fixed in the frame of the movable pointer in such a way that p is directed in the direction and the natural (ergonomic) sense of pointing of the movable pointer. The orientation and/or the position of the frame of the movable pointer in the reference frame also makes it possible to provide a second data item of orientation of the movable pointer through the definition of a second vector belonging to the plane perpendicular to the vector p (for example denoted r1 in FIG. 1, corresponding the position 111 of the pointer). This second orientation vector r1 makes it possible if appropriate to compute an orientation of the cursor on the display surface.

In a so-called "absolute pointing" mode, direct use is made of the coordinates of the point 121 (for the pointer in position 111) or 122 (for the pointer in position 112) in the projection surface and optionally a transformation (150) between the projection surface and the display surface to obtain the coordinates of the cursor in the display surface. Thus, to a physical position/orientation of the movable pointer in the reference frame there corresponds one and only one position of the cursor in the display surface. The same method will be used for the orientation.

The computation of 121, 122 according to the data item regarding the position and orientation of the movable pointer can be carried out analytically for models of simple surfaces and assumptions on the position of the movable pointer, as is detailed hereinbelow. The computation of displacement of the cursor on the display surface can then be implemented directly by application of the analytical formula found. The computations set forth make it possible to cover many applications and much ergonomics. However it will also be possible to cover other cases, with other projection surfaces and/or other cases where the data regarding positions and/or orientation of the movable pointer must be taken into account. Embodiments of the invention can be generalized to these other cases. If the analytical computation is complex or impossible to conduct, for example for complex or arbitrary surfaces, it will be possible to use numerical procedures for computing intersection of straight lines with surfaces (ray tracing procedures for example). The numerical computation of intersection of the pointer with the surface can then be integrated into the cursor displacement computation. A procedure making it possible to process arbitrary surfaces is also detailed hereinbelow.

The successive orientation/positions of the movable pointer over time (for example demarcated by 111 and 112 as successive positions and orientation of the pointer over time) are thus transformed into positions/orientations of the cursor on the screen (101 corresponds to 111, and 102 corresponds to 112). This absolute mode is similar to that which can be implemented by graphical tablets, in "absolute" mode: to a position of the tip of the pen on the tablet there corresponds a position of the cursor on the screen.

In a so-called "relative pointing" mode, the position of the cursor on the screen is driven by data of successive displacements which increment its position on the display surface. This type of pointing is similar to that very widely developed for pointing devices of mouse type for computers. In an embodiment of the invention, the movable pointer takes successive positions/orientations over time. FIG. 1 makes it possible to illustrate this principle. Let $p_1$ and $p_2$ be the direction vectors associated with the frame of the movable pointer for two successive instants. 121 and 122 are the projection points of these vectors $p_1$ and $p_2$ on the projection surface. They make it possible to form a difference vector ($\Delta x, \Delta y$) (denoted 131, 132) in the metric system associated with the projection surface. ($\Delta x, \Delta y$) are optionally transformed by a transformation 150 from the projection surface to the display surface and the result (101A, 102A) is used to control the displacement ($\Delta x_A, \Delta y_A$) of the cursor on the display surface.

Furthermore, two main embodiments of the invention are illustrated in detail in the subsequent description:
- in a first procedure explained hereinabove, the position or the displacement of the cursor is determined on the basis of the attitude and/or the position of the pointer in the reference frame; the attitude can be given in the form of a matrix or else of an attitude quaternion, or of any other representation of the attitude of the pointer, for example the Euler angles or gimbal angles; the position can be given by a vector defining the coordinates of a point of the pointer in the reference frame;
- in a second procedure, the displacement of the cursor is determined on the basis of the angular velocity and/or, of the attitude of the movable pointer; the displacement of the cursor will be a function of the angular velocity and of the attitude measured in a frame tied to the earth; several solutions are set forth in the subsequent description for utilizing this angular velocity parameter in a frame tied to the earth.

Moreover, it is possible to control the orientation of the cursor on the screen with the aid of the movements of the pointer, thereby making it possible to launch different functions as a function of this orientation of the cursor.

As illustrated in FIG. 1, the projection of the vector r1 perpendicular to $p_1$ onto the projection surface provides a second vector 141. The direction of the vector 141 thus formed in the projection surface (in the sense of the metric of the surface 130) makes it possible to drive the orientation of the cursor in the display surface by the same transformation 150.

The computation of the orientation of the cursor on the screen can for example be performed in the following manner:
- the vector r1 is given for example by the second or third column of the movable pointer attitude matrix R ($p_1$ being defined by the first column), the definition of which is detailed further on in the description;
- then the angle which determines the orientation of the cursor in the frame of the projection surface can be computed by:

$$\varphi = A\tan(r'1 \cdot Y_E / r'1 \cdot X_E)$$

where r'1 is the projection of r1 in the direction of p1 to the projection surface, "·" is the scalar product operator, $X_E, Y_E$ form a frame on the projection surface as detailed below as commentary to FIG. 5.

The cursor orientation computation can also be performed by integration of the angular velocity measured on an axis.

Several physical devices and types of algorithms can be used to estimate the attitude, the angular velocity of the attitude and/or the position and/or the translation of the pointer.

It is firstly possible to use inertial devices onboard the pointer comprising combinations of accelerometers (A), of gyrometers (G) and of magnetometers (M). The accelerometers and the magnetometers make it possible to measure the orientation of the pointer with respect to a fixed vector, respectively, gravity and the terrestrial magnetic field. They are however affected by perturbations (inherent acceleration and ambient magnetic perturbations, respectively) which are preferably corrected. The gyrometers measure the inherent angular velocity of the movements of the pointer. The gyrometers are generally affected by an appreciable temporal drift which is preferably corrected regularly. These sensors can be Micro Electro Mechanical Systems (MEMS), optionally integrated, or produced in other, non-integrated, technologies. Each type of sensor can comprise one, two or three axes. In certain applications, a single type of sensor (in this case with three axes) can be used, if the perturbations or the temporal drift can be considered to be negligible so that the final data item regarding orientation, desirable for various embodiments of the invention is sufficiently precise, or be corrected without recourse to another type of sensor. In a favored manner, a combination of at least two types of sensors, AG, MG or AM will be used however.

It should be noted that these three types of sensors procure complementary information with a view to better estimation of the orientation, notably:

The three-axis version of the gyrometer provides measurements of angular velocity in relation to three DOF (Degrees of Freedom) and makes it possible to estimate the attitude by integrating the angular velocity. It therefore makes it possible to compute a relative orientation with respect to a given orientation. This principle of estimating the orientation is subject to drift because of the integration operation, if the gyrometer is used alone;

The three-axis accelerometer provides 2 items of absolute angular information with respect to a terrestrial frame (roll and pitch), but is subject to perturbations when the motions are not quasi-static since it measures at the same time the motion-related acceleration parameters;

The three-axis magnetometer provides 2 absolute angular degrees of freedom (which are combinations of the yaw with the other angles of pitch and roll) with respect to a terrestrial frame but is subject to the magnetic perturbations of the environment.

As regards the gyrometers, it is for example possible to use the gyrometers supplied by Analog Devices™ with reference ADXRS300™, or the ITG3200™ from Invensense™ or the gyrometers supplied by STM™.

As regards the accelerometers, it is possible to use for example accelerometers with the reference ADXL103 from Analog Devices, LIS302DL from STM. FreeScal™, Kionix™ also supply such sensors.

As regards the magnetometers, it is for example possible to use the magnetometers with the reference HMC1001™ or HMC1052 or HMC1053 from the company Honeywell™. AKM™ also supplies micromagnetometers (AK8973, AK8974, AK8976).

Various algorithms can be used to correct the perturbations and merge the signals of the various types of sensors and estimate the attitude, for example those disclosed by the international application published under the No. WO2010/007160, one of the proprietors of which is the proprietor of the present application.

As regards the modules for computing the orientation on the basis of these types of sensors, it will be possible to refer to the products from the company Movea™ or products from the co XSens™, or Intersense™ with for example the family of InertiaCube™ products.

With the help of the systems based on inertial sensors onboard the movable pointer, it is also possible to estimate the trajectory and therefore a position relative to an arbitrary starting point of the pointer.

The processing of the orientation and/or position measurements for the computation of the position of the cursor is performed in a computation module. The computation can be embedded onboard the movable pointer or offloaded to the computer tied to the display surface (for example a PC or a SetTopBox). It is possible to cite for the microprocessors, for example a Texas Instruments™ TMS320VC5509™ DSP for the most demanding applications in terms of computation time, or a 32-bit microcontroller with ARM™ core, for example one of those from the STR9™ family, notably the STR9F12FAW32™ from STM. The computation module also preferably comprises a flash memory required for storing the code to be executed and permanent data which are required therefore and a dynamic work memory.

The signals arising from the sensors or processed aboard the movable pointer are transmitted to another microprocessor, generally the one which executes the application and manages the display surface. The application is controlled by the cursor whose displacements are controlled by the pointer. Transmission can take place by radiofrequency pathway with a Bluetooth waveform and protocol or with a Wi-Fi waveform and protocol (802.11g Standard) or according to the RF4CE standard. Transmission can also be performed by infra-red pathway. The processings can be distributed in a variable manner between the microprocessor of the application platform and/or the microcontroller onboard the pointer.

To estimate the position, the attitude or the angular velocity of the orientation, it is also possible to use other systems, such as those cited hereinbelow:

Optical systems comprising Light Emitting Diodes (LEDs), other infrared markers or sensors; systems of this type are marketed under the CodaMotion™ or Vicon™ brands; in such systems, the algorithmics making it possible to estimate the attitude or the angular velocity of the orientation can notably use the power of the detected signal, the angle of arrival or its phase;

Magnetic systems comprising magnetic sources located outside the pointer, in the environment of the screen, said pointer being instrumented with a magnetometer suited to the magnetic sources; it will be possible to refer to the devices from the companies Ascencion Technology™ or Polhemus™;

Ultrasound systems comprising one or more ultrasound emitters/receivers, the emitter or emitters being embedded onboard the pointer and the receiver being fixed on the screen; the algorithmics making it possible to estimate the attitude or the angular velocity of the orientation can notably use a correlation and a decorrelation of the sound waves received by the receivers (for example the IS-900 System from Intersense);

Systems using radiofrequency waves comprising one or more radiofrequency wave emitters/receivers, the emitter or emitters being embedded onboard the pointer and the receiver being fixed on or in the neighborhood of the screen or the converse; these emitters/receivers can notably be of the UWB (Ultra Wide Band) type; the algorithmics making it possible to estimate the attitude or the angular velocity of the orientation can notably use a merging of the signals corresponding to the angles of arrival, to the amplitude of the signals received and to their arrival time or to their phase;

Video systems comprising one or more video cameras installed on or in the neighborhood of the screen; the algorithmics making it possible to estimate the attitude or the angular velocity of the orientation can notably use an analysis and a processing of the images of the pointer motion which are extracted by the video cameras.

Figures 2A, 2B, 2C:
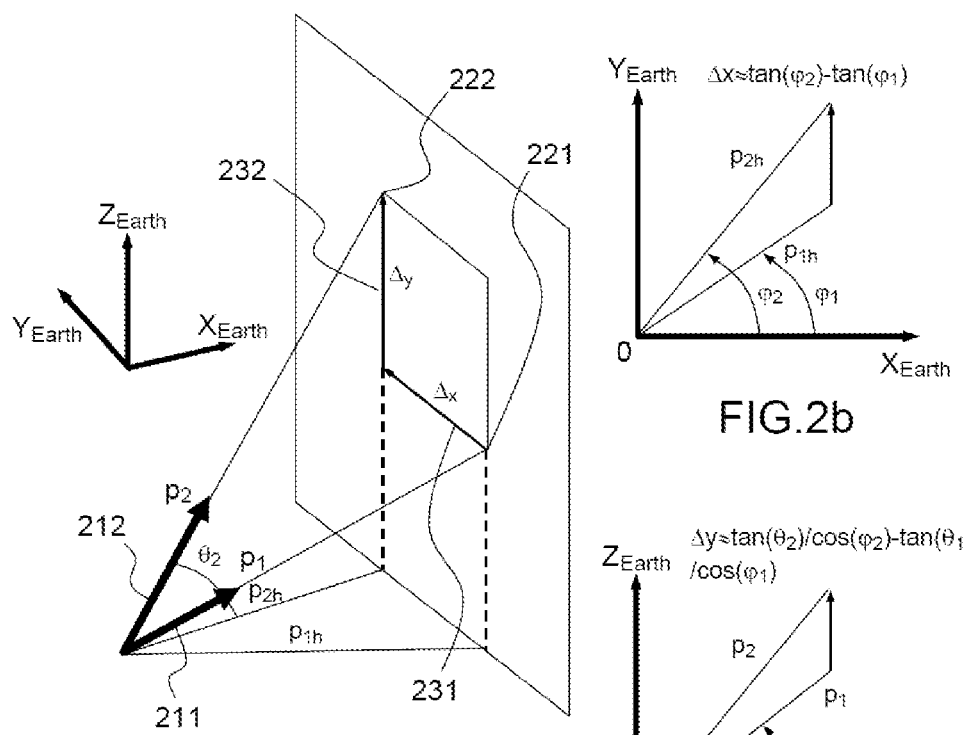
FIGS. 2a, 2b and 2c represent the principle of determining the displacement parameters or position parameters of a cursor on the basis of the angles of yaw and of pitch of the direction vector carried by a pointer in a reference frame and by using a vertical plane projection surface, in an embodiment of the invention.

FIGS. 2a, 2b and 2c represent the transformation of the angles of yaw and of pitch of a pointer into position or displacement of a cursor, by choosing a vertical plane surface as projection surface, in an embodiment of the invention.

In the figure, it is assumed that the position of the pointer is fixed arbitrarily. In the general case it may nonetheless be variable over time. This illustration corresponds to the case, for example, where an orientation measurement is available without the position measurement. Only the orientation of the movable pointer is measured. The principle set forth remains applicable for a measured variable pointer position not arbitrarily fixed.

In the mode illustrated in FIG. 2, the position of the cursor on the display surface is computed in the following manner: the intersection is computed of the straight line carried by the vector p ($p_1$, $p_2$ for example) tied to the pointer with the projection surface which is a plane surface here. The direction vector of the straight line is the vector $p_1$, 211 (respectively $p_2$, 212). The intersection of the straight line with the projection surface is demarcated by the points 221 and 222 for the two direction vectors $p_1$ and $p_2$ corresponding to two successive orientations of the movable pointer.

Consider the rotation matrix R (or the quaternion q) which defines the attitude of the pointer in relation to a frame tied to the earth, which here is taken as reference frame, "Earth Frame". R is provided by the movable pointer orientation measurement device.

Consider the 3D pointer vector, $p=[p_x \ p_y \ p_z]^T$ with $\|p\|=1$. For the sake of simplification and by convention, it is assumed here that p coincides with the vector x of the frame tied to the pointer, this definition being non-restrictive and being able to be replaced with another appropriate definition, within the range of the person skilled in the art. In relation to the Earth Frame, p is then the first column of the matrix R.

Let ($\Delta x, \Delta y$), 231, 232, be the displacement of the point of intersection from 221 to 222 on the projection surface (here a vertical plane) when the pointer is displaced from the orientation $p_1$ to the orientation $p_2$. For the sake of simplification, without restricting the generality, in this illustration an identity transformation will be taken between the displacement of the cursor on the display surface that it is necessary to determine and the displacement of the point of intersection on the projection surface. In general, $\Delta x$ is horizontal and $\Delta y$ is in a vertical plane;

In the general case (when the projection surface is not plane), $\Delta x$ and $\Delta y$ are not necessarily straight segments but may be curvilinear distances on curve elements (for example, the arc of a circle).

Consider the two angles: $\varphi$ (yaw) and $\theta$ (pitch) which are related to p $\varphi = A\tan(p_y/p_x)\ ]-\pi,\pi[$ $\theta = A\tan(p_z/\sqrt{p_x^2+p_y^2})\ ]-\pi/2,\pi/2[$ In FIGS. 2a, 2b and 2c is illustrated the differential on each surface as a function of an elementary displacement according to the yaw ($\varphi 1 \rightarrow \varphi 2$) and according to the pitch ($\theta 1 \rightarrow \theta 2$). $\varphi$ and $\theta$ can be determined on the basis of $p=[p_x \ p_y \ p_z]^T$ as indicated hereinabove.

It is possible to compute the displacements $\Delta x$ and $\Delta y$ through the following formulae:

$$\Delta X = G(\tan(\varphi_2) - \tan(\varphi_1))$$

$$\Delta Y = G\left(\frac{\tan(\theta_2)}{\cos(\varphi_2)} - \frac{\tan(\theta_1)}{\cos(\varphi_1)}\right)$$

When the yaw or the pitch approach $\pm\pi/2$ the displacement of the cursor increases in absolute terms and tends to infinity.

G is a constant which depends on the distance between the pointer and the plane and is therefore related to the arbitrary position given to the pointer. It makes it possible to adjust the proportion between the angular displacement of the pointer and the displacement of the cursor.

Figure 3A:
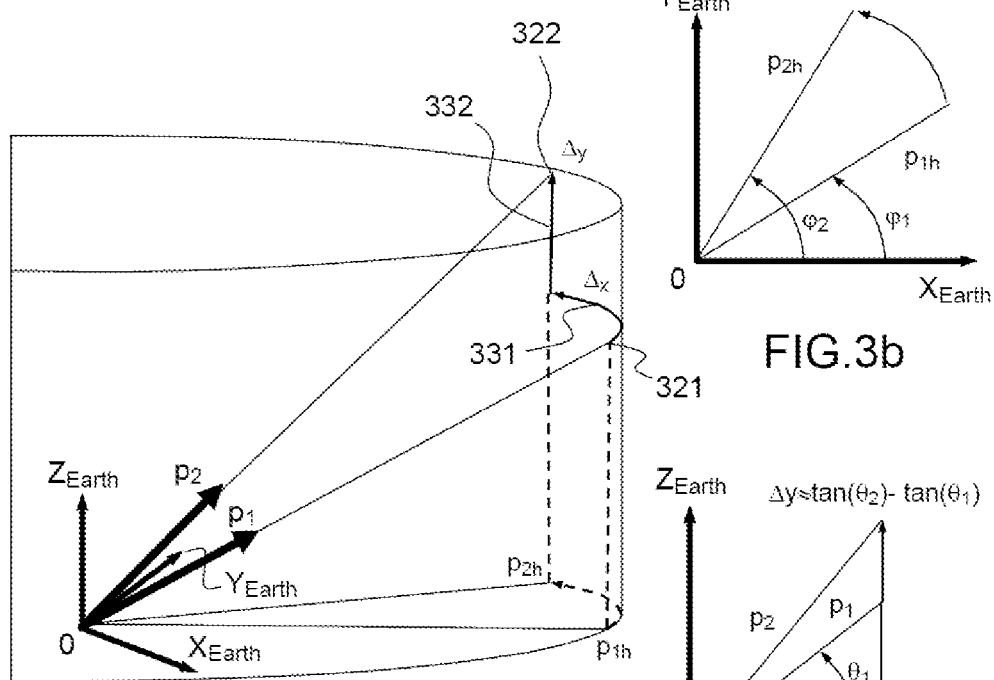
FIGS. 3a, 3b and 3c represent the principle of determining the displacement parameters or position parameters of a cursor on the basis of the angles of yaw and of pitch of the direction vector carried by a pointer in a reference frame and by using a cylindrical projection surface, in an embodiment of the invention.
Figure 3B:
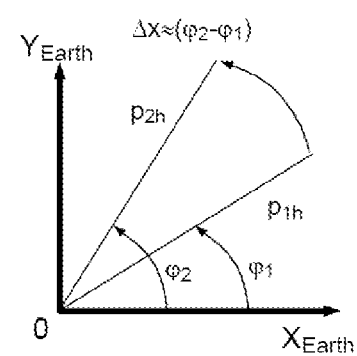
Figure 3C:
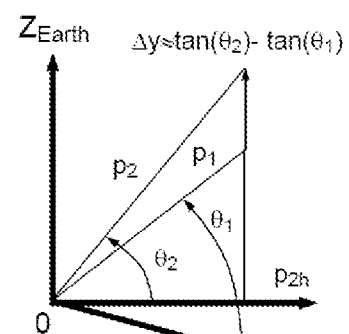

FIGS. 3a, 3b and 3c represent a step of the transformation of the angles of yaw and of pitch of a pointer into motion of a cursor for a cylindrical projection surface, in an embodiment of the invention.

In the figure, it is assumed that the position of the pointer is fixed arbitrarily. In the general case it may nonetheless be variable over time. This illustration corresponds for example to the case where an orientation measurement is available without the position measurement. Only the orientation of the movable pointer is measured. The principle set forth remains applicable for a measured variable pointer position not arbitrarily fixed.

It will be assumed for the sake of simplicity that the position of the pointer is fixed arbitrarily on the axis of the cylinder. It will be easy to generalize the invention to the case of a positionally movable pointer, the principle remaining the same. Under the conditions set forth, it is possible to conduct the computation analytically.

The displacement of the cursor along the horizontal $\Delta x$, 331 is proportional to the rotation of the movable pointer according to the yaw. It is possible to compute the displacements $\Delta x$ and $\Delta y$, 331, 332, with the following formulae:

$$\Delta X = G(\varphi_2 - \varphi_1)$$

$$\Delta Y = -G(\tan(\theta_2) - \tan(\theta_1))$$

The displacement of the cursor along the vertical $\Delta y$, 332, increases in absolute terms and tends to infinity as the pitch approaches $\pm\pi/2$.

In this case, $\Delta x$, 331, is indeed a curvilinear length. The assumption here is that the pointer is placed at the center of the cylinder. G is equal to the distance between the pointer and the cylinder, i.e. equal to the radius of the cylinder.

Figures 4A, 4B, 4C:
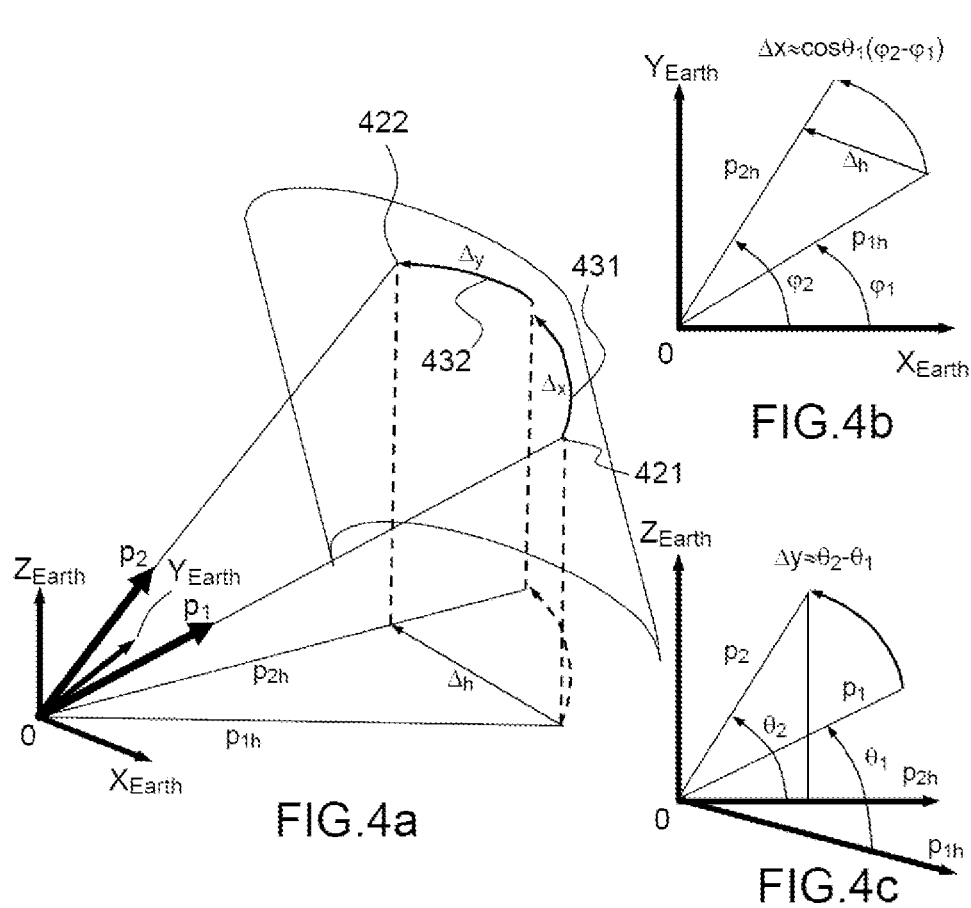
FIGS. 4a, 4b and 4c represent the principle of determining the displacement parameters or position parameters of a cursor on the basis of angles of yaw and of pitch of the direction vector carried by a pointer in a reference frame and by using a spherical projection surface in an embodiment of the invention.

FIGS. 4a, 4b and 4c represent the transformation of the angles of yaw and of pitch of a pointer into motion of a cursor for a spherical projection surface in an embodiment of the invention.

In the figure, it is assumed that the position of the pointer is fixed arbitrarily. In the general case it may nonetheless be variable over time. This illustration corresponds for example to the case where an orientation measurement is available without the position measurement. Only the orientation of the movable pointer is measured. The principle set forth remains applicable for a measured variable pointer position not arbitrarily fixed.

It will be assumed for the sake of simplicity that the position of the pointer is fixed, placed at the center of the sphere. It will be easy to generalize the invention to the case of a positionally movable pointer, the computation principle remaining the same.

The displacement of the cursor along the horizontal Δx, 431, is proportional to the rotation according to the yaw and decreases and tends to zero as the pitch approaches ±π/2. The displacement of the cursor along the vertical Δy, 432, is proportional to the pitch. It is possible to compute the displacements Δx and Δy, 431, 432, with the following formulae:

$$\Delta X = G(\varphi_2 - \varphi_1)\cos\theta_1$$

$$\Delta Y = -G(\theta_2 - \theta_1)$$

In this case, Δx, 431, and Δy, 432, are both curvilinear lengths. The assumption here is that the pointer is placed at the center of the sphere. G is equal to the distance between the pointer and the sphere, i.e. equal to the radius of the sphere.

Figure 5A:
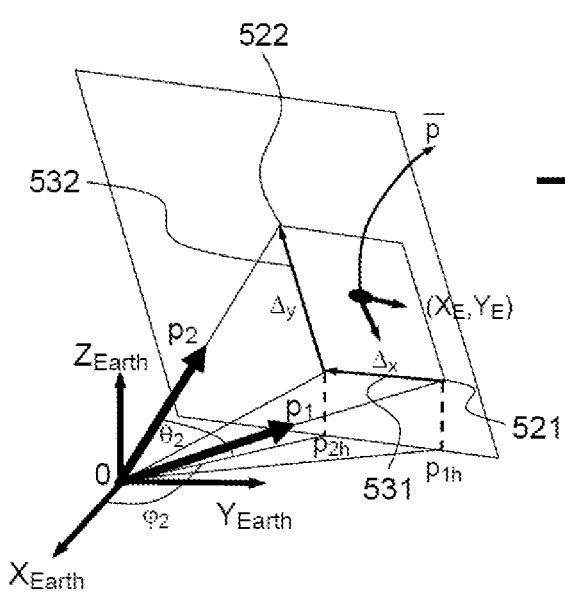
FIGS. 5a, 5b and 5c represent the principle of determining the displacement parameters or position parameters of a cursor on the basis of the angles of yaw and of pitch of the direction vector carried by a pointer in a reference frame by using an arbitrary projection surface, in an embodiment of the invention.
Figure 5B:
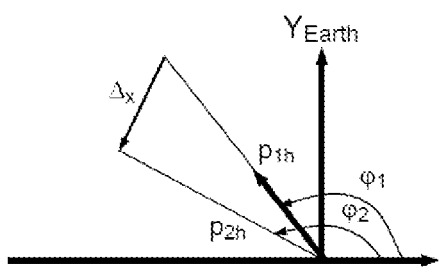
Figure 5C:
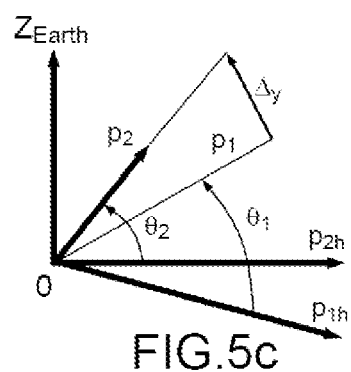

FIGS. 5a, 5b and 5c represent the transformation of the angles of yaw and of pitch of a pointer into motion of a cursor for an arbitrary projection surface approximated by small plane elements in an embodiment of the invention.

The arbitrary surface is approximated for each position/orientation of the pointer by a small plane surface for which FIGS. 5a, 5b and 5c present the principle of determining the position or of displacing the cursor.

To compute the position of the cursor, the intersection is computed of a straight line carried by the vector p with the projection surface. An elementary surface is then considered, defined by the frame $(X_E, Y_E)$, where:

- $X_E$ is horizontal (i.e. $X_E//\text{Plane}(X_{Earth}, Y_{Earth})$); this is manifested by the fact that the component along $Z_{Earth}$ is zero, hence $X_E = [\cos(\alpha)\sin(\alpha) 0]^T$;
- $Y_E$ is in a vertical plane and perpendicular to $X_E$; this is manifested by the fact that the component along $(X_{Earth}, Y_{Earth})$ is perpendicular to $X_E$, hence $Y_E = [-\cos(\beta)\sin(\alpha)\cos(\beta)\cos(\alpha) - \sin(\beta)]^T$.

For $Y_E$ to be downwards it is necessary that $-\pi/2 < \beta \leq \pi/2$.

It is possible to compute the displacements Δx and Δy, 531, 532, with the following formulae:

$$\Delta X = \frac{(\vec{n} \cdot \vec{p}) \cdot (p_1 \wedge p_2 \cdot Y_E)}{(\vec{n} \cdot p_1)(\vec{n} \cdot p_2)}$$

$$\Delta Y = -\frac{(\vec{n} \cdot \vec{p}) \cdot (p_1 \wedge p_2 \cdot X_E)}{(\vec{n} \cdot p_1)(\vec{n} \cdot p_2)}$$

Where:

As indicated above, $p_1$ and $p_2$ are the vectors defined at the two successive orientations of the pointer;

$\vec{n} = X_E \wedge Y_E$ is the vector normal to the pointed-at surface;
$\vec{p} = [\bar{p}_x, \bar{p}_y, \bar{p}_z]^T$ a point belonging to this elementary surface (e.g. $\vec{p} = kp_1$);
"∧" and "·" represent the vector product, and scalar product operators respectively.

By way of exemplary realization of the above principle of arbitrary projection surface, the computations are detailed hereinbelow in the case of a vertical plane projection surface perpendicular to $X_{Earth}$ ($\vec{p} = kp_1$, $\alpha = \pi/2$ and $\beta = \pi/2$). i.e. then $X_E = [0 1 0]^T$ and $Y_E = [0 0 -1]^T$ $$\Delta X = \frac{G}{p_{x1}p_{x2}}(p_{x1}p_{y2} - p_{x2}p_{y1}) = G(\tan(\varphi_2) - \tan(\varphi_1)), p_{x1} > 0$$

and $p_{x2} > 0$ $$\Delta Y = \frac{-G}{p_{x1}p_{x2}}(p_{x1}p_{z2} - p_{x2}p_{z1}) = G\left(\frac{\tan(\theta_2)}{\cos(\varphi_2)} - \frac{\tan(\theta_1)}{\cos(\varphi_2)}\right),$$

$p_{x1} > 0$ and $p_{x2} > 0$

We thus obtain the case illustrated by FIGS. 2a, 2b and 2c and the same formulae.

The case of a plane elementary surface of a vertical cylinder along the axis $Z_{Earth}$ is also detailed by way of exemplary realization of the above principle of arbitrary projection surface.

For: $\vec{p} = k[p_{x1} p_{y1} 0]^T/\sqrt{p_{x1}^2 + p_{y1}^2}$, $\alpha = \pi/2 + \varphi$ and $\beta = \pi/2$ (the approximation $p_1 \cdot p_2 \to 1$ will be used for the case of small displacements) i.e. then $$X_E = [-\bar{p}_y \bar{p}_x 0]^T/\sqrt{\bar{p}_x^2 + \bar{p}_y^2} \text{ and } Y_E = [0 0 -1]^T$$

$$\Delta X = \frac{G}{p_{x1}p_{x2} + p_{y1}p_{y2}}(p_{x1}p_{y2} - p_{x2}p_{y1}) \sim G\sin(\varphi_2 - \varphi_2) \sim G(\varphi_2 - \varphi_2),$$

$$\Delta Y = \frac{-G[p_{z2}(p_{x1}^2 + p_{y1}^2) - p_{z1}(p_{x1}p_{x2} - p_{y1}p_{y2})]}{(p_{x1}p_{x2} + p_{y1}p_{y2})\sqrt{p_{x1}^2 + p_{y1}^2}} \sim \frac{-G[p_{x2} - p_{x1}]}{\sqrt{p_{x1}^2 + p_{y1}^2}} =$$

$$-G(\tan(\theta_2) - \tan(\theta_1))$$

Within the framework of the small displacements approximation ($p_1 \cdot p_2 \to 1$), the case illustrated by FIGS. 3a, 3b and 3c is obtained.

Figure 6A:
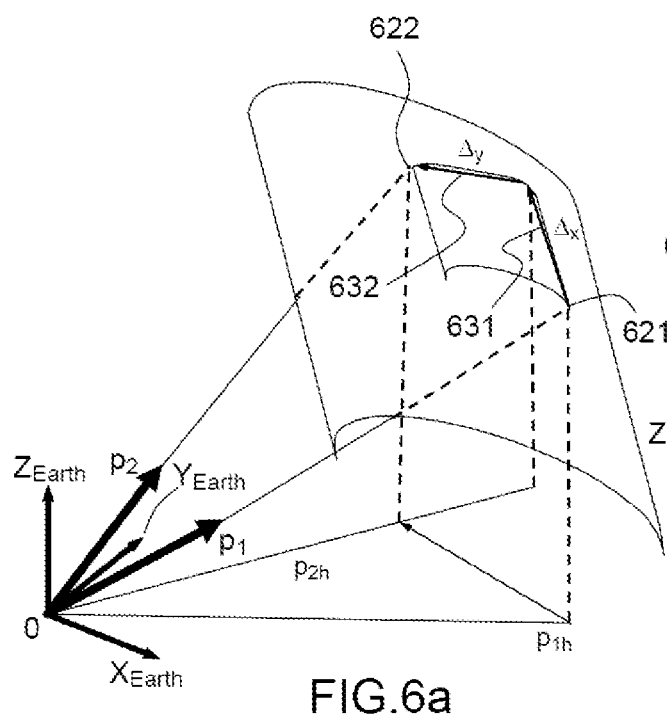
FIGS. 6a, 6b and 6c represent the principle of determining the displacement parameters or position parameters of a cursor on the basis of the angles of yaw and of pitch of the direction vector carried by a pointer in a reference frame by approximating a spherical projection surface by a plane surface, according to an application of the principle of FIG. 5, in an embodiment of the invention.
Figure 6B:
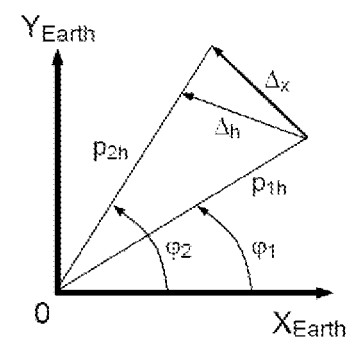
Figure 6C:
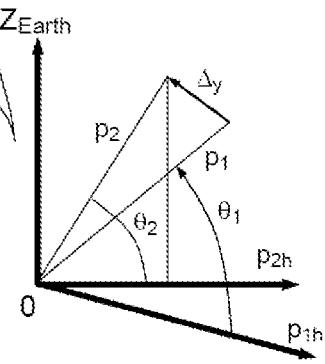

FIGS. 6a, 6b and 6c represent the transformation of the angles of yaw and of pitch of a pointer into motion of a cursor on a spherical surface approximated by plane surfaces in an embodiment of the invention.

For: $\vec{p} = kp_1$, $\alpha = \pi/2 + \varphi$ and $\beta = \pi/2$ (the approximation $p_1 \cdot p_2 \to 1$ will be used for the case of small displacements).

i.e. then $X_E = \text{Normalized}([-\bar{p}_y \bar{p}_x 0]^T)$ and $$Y_E = \text{Normalized}([\bar{p}_x \bar{p}_z \bar{p}_y \bar{p}_z -(\bar{p}_x^2 + \bar{p}_y^2)]^T)$$

It is possible to compute the displacements Δx and Δy, 631, 632, with the following formulae:

$$\Delta X = \frac{G(p_{x1}p_{y2} - p_{x2}p_{y1})}{(p_{x1}p_{x2} + p_{y1}p_{y2} + p_{z1}p_{z2})\sqrt{p_{x1}^2 + p_{y1}^2}} \sim \frac{G(p_{x1}p_{y2} - p_{x2}p_{y1})}{\sqrt{p_{x1}^2 + p_{y1}^2}} =$$

$$G\cos(\theta_1)\sin(\varphi_2 - \varphi_1)$$

$$\Delta Y = \frac{-G[p_{z2}(p_{x1}^2 + p_{y1}^2) - p_{z1}(p_{x1}p_{x2} + p_{y1}p_{y2})]}{(p_{x1}p_{x2} + p_{y1}p_{y2} + p_{z1}p_{z2})\sqrt{p_{x1}^2 + p_{y1}^2}} \sim -G\sin(\theta_2 - \theta_1)$$

Within the framework of the small displacements approximation ($p_1 \cdot p_2 \to 1$), the case illustrated by FIGS. 4a, 4b and 4c is obtained.

The method described in this embodiment of the invention also proposes to utilize the angular velocity of the pointer.

Figure 7:
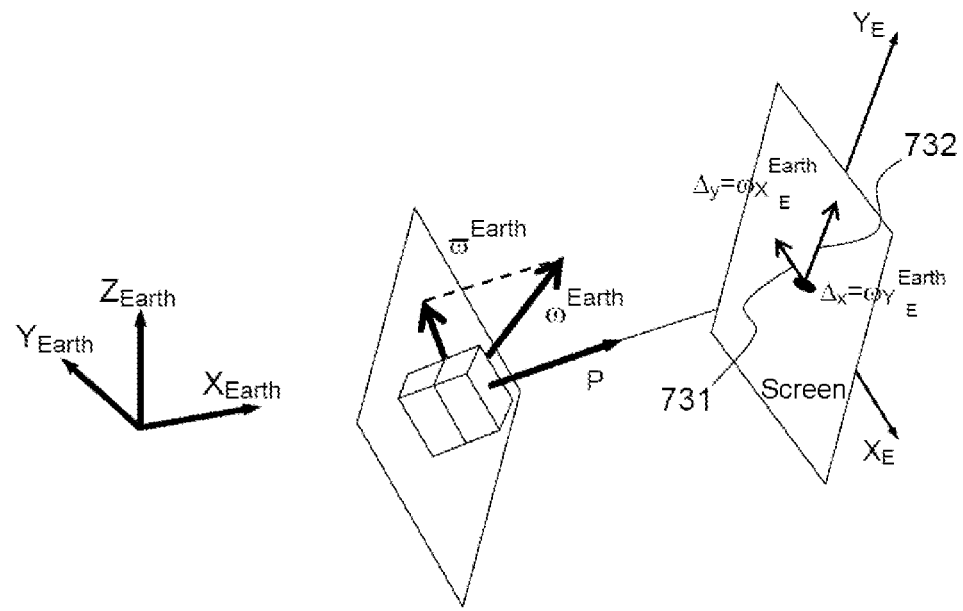
FIG. 7 represents the principle of determining the displacement parameters of a cursor on the basis of the angular velocity of a pointer, by zeroing the effect of the roll velocity of the pointer on the displacement of the cursor, in an embodiment of the invention.

FIG. 7 represents the computation of the motions of a cursor on the basis of the components of angular velocity of the attitude of a pointer projected into a plane surface in an embodiment of the invention.

For example, the angular velocity of the pointer can be determined on the basis of the angular velocity measured in the sensor frame.

We use the angular velocity measured by the sensor and recomputed by virtue of the attitude in the earth frame:

$$\omega^{Earth}(t)=[\omega_x, \omega_y, \omega_z]^T = R(t)\omega^{Sensor}(t)$$

The angular velocity of the pointer can also be determined on the basis of the data regarding the attitude of the pointer, by a differentiation operation:

The attitude of the pointer being provided by a quaternion $q(t)=[q_0\ q_1\ q_2\ q_3]^T$, the angular velocity of the pointer is then given by the formula:

$$\omega^{Earth}(t) = [\omega_x\ \omega_y\ \omega_z]^T = 2/dt * \mathrm{atan}\left(\frac{\sqrt{\dot{q}_1^2 + \dot{q}_2^2 + \dot{q}_3^2}}{\dot{q}_0}\right)[\dot{q}_1\ \dot{q}_2\ \dot{q}_3]^T$$

where $\dot{q}=q(t)\odot \tilde{q}(t-1)$ where $\odot$ represents the product of quaternions and $\tilde{q}$ is the conjugate of q.

On the basis of the pointer angular velocity determined for example according to the above principles, it is then appropriate to determine the displacement $\Delta x, \Delta y$, 731, 732 of our cursor and to avoid any displacement due to the component $\omega_x^{sensor}$. Indeed, the roll should not cause any cursor displacement, which would be counter natural.

A first solution, illustrated by FIG. 7, is to set $\omega_x^{sensor}$ to zero and then to perform a transformation in the frame tied to the earth; we then compute:

$$\tilde{\omega}^{Earth}(t)=R_x(t)\omega^{Sensor}(t)$$

$$\tilde{\omega}^{Earth}(t)=R_x(t)R^T(t)\omega^{Earth}(t)=\omega^{Earth}(t)-(\omega^{Earth}(t)\cdot p)p$$

where $R_x$ is the same as R on replacing the first column by zeros.

It is then possible to compute the displacement of the cursor $\Delta x, \Delta y$, 731, 732 according to any elementary surface pointed at by p through the formulae:

$$\Delta X=G_x Y_E^T \tilde{\omega}^{Earth}$$

$$\Delta Y=G_y X_E^T \tilde{\omega}^{Earth}$$

Where $G_x$ and $G_y$ are gains which may be a function of p.

Figure 8:
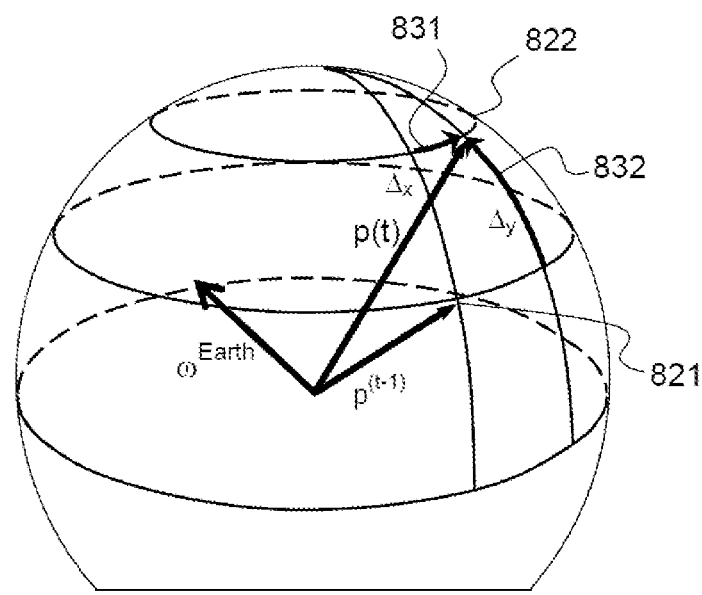
FIG. 8 represents the principle of determining the displacement parameters of a cursor on the basis of the angular velocity of a pointer for a spherical projection surface centered on the origin of the pointer frame, in an embodiment of the invention, thereby zeroing the effect of the roll velocity on the displacement of the cursor.

A second solution, illustrated by FIG. 8, is to determine the displacement on an elementary surface $(\Delta x, \Delta y)$ which is always taken perpendicular to the pointer p. Then, $$X_E=\mathrm{Normalized}([-p_y, p_x, 0]^T) \text{ and } Y_E=\mathrm{Normalized}([p_x p_z, p_y p_z, -(p_x^2+p_y^2)]^T)$$

This choice makes it possible to eliminate the effect of a roll rotation of the pointer on the $\Delta x$ and $\Delta y$ because the surface is perpendicular to the pointer. This elementary surface forms part of a sphere centered at the pointer. The displacement of the cursor $\Delta x, \Delta y$, 831, 832 is then computed with the following formulae:

$$\Delta X=Y_E^T \omega^{Earth}$$

$$\Delta Y=X_E^T \omega^{Earth}$$

Figure 9:
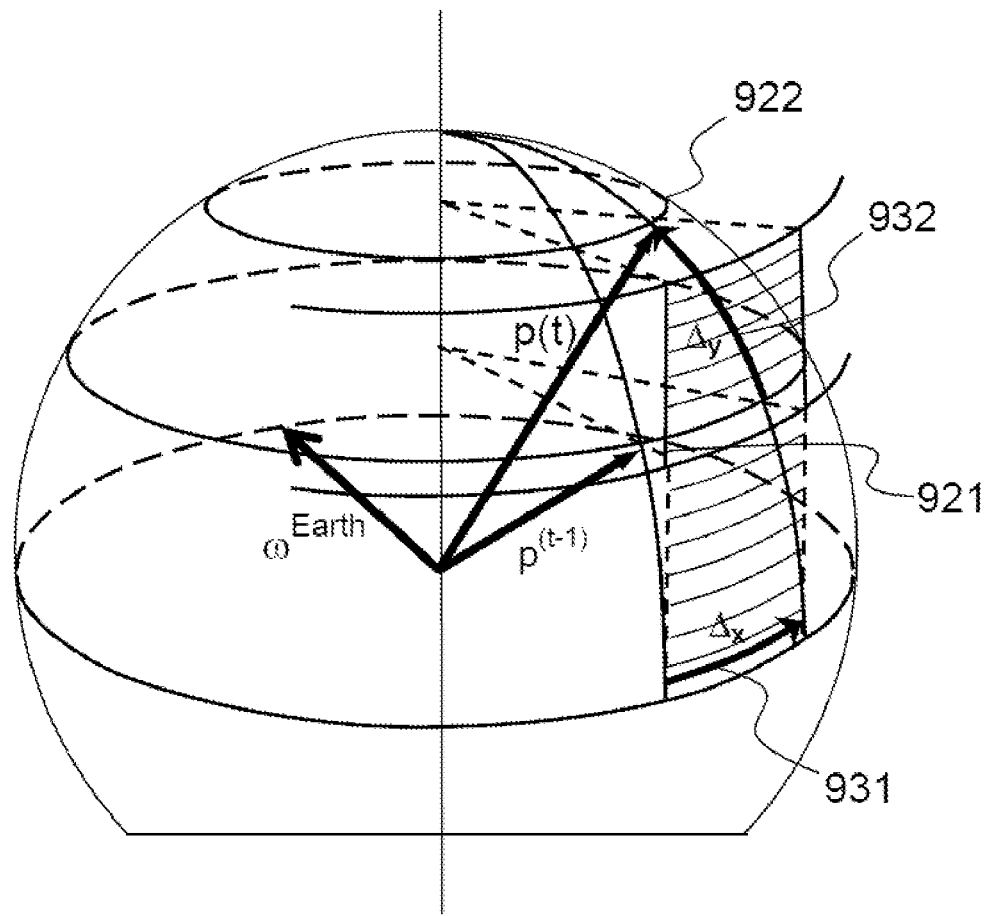
FIG. 9 represents the transformation of the displacement parameters of a cursor on the basis of the results of outcomes of a spherical projection surface of FIG. 8 onto another surface in an embodiment of the invention; the surface chosen here is a cylinder for the component Δx.

FIG. 9 illustrates a possible transformation of the previous result to transform the displacements of a cursor in the previous spherical model into displacements in another surface in an embodiment of the invention.

Let us note that this principle is general that the computed displacement $\Delta x, \Delta y$ can subsequently be transformed so that it is suited to any surface, for example for a displacement proportional to the angular velocity, as illustrated in FIG. 9. A cylindrical surface model is thus used to transform $\Delta x$ computed initially on the sphere. Thus:

$$\Delta X=Y_E^T \omega^{Earth} \sqrt{p_x^2+p_y^2}$$

$$\Delta Y=X_E^T \omega^{Earth}$$

Once $\omega^{Earth}$ has been determined with roll removed it is possible in an equivalent manner to transform the displacement onto another surface.

Figure 10A:
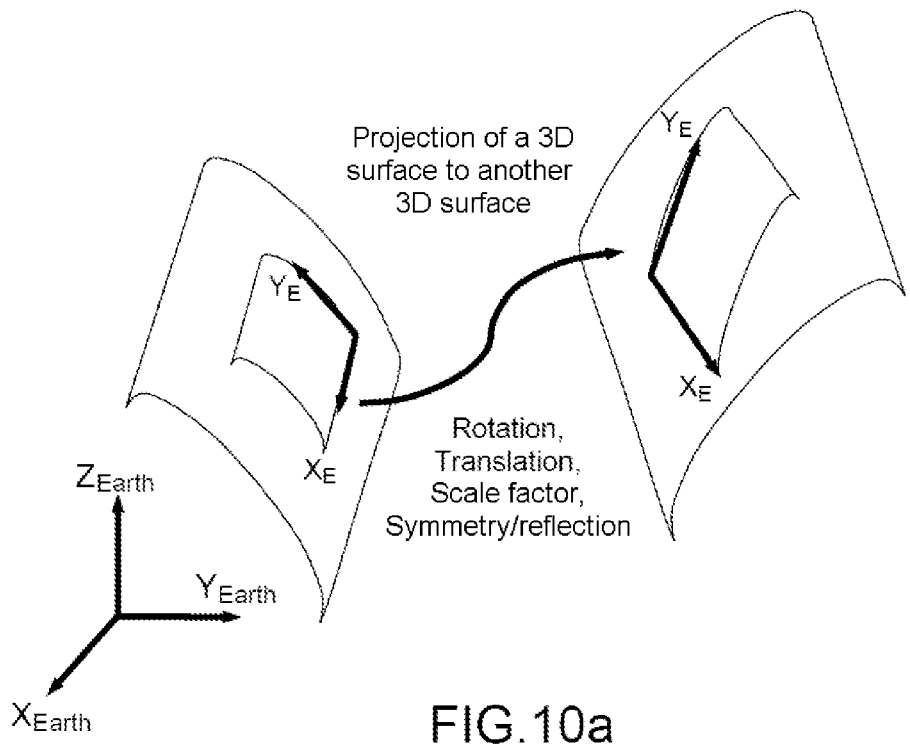
FIGS. 10a and 10b illustrate the principle of transforming the displacements or the position or the orientation of a cursor obtained for a first type of projection surface into displacements or position for a second type of projection surface in an embodiment of the invention.
Figure 10B:
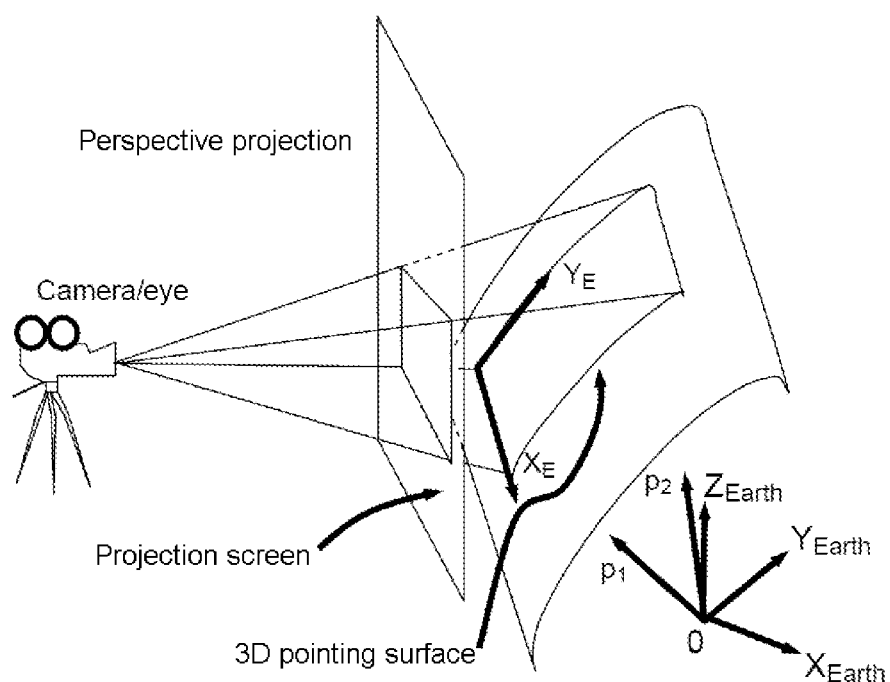

FIGS. 10a and 10b illustrate possible projections for transforming the positions/displacements of a cursor in one surface into positions/displacements in another surface in an embodiment of the invention.

Once the position of the cursor has been determined for a given surface, it is always possible to transform/project the cursor to another surface. A transformation can be composed of a sequence of translations, rotations, reflections/symmetries, or scale factors.

Transformations by perspective projection can also be applied. These transformations make it possible to project 3D pointing surfaces onto a 2D screen in such a way that the projection corresponds to the perception of the human eye from an angle of vision. Several types of perspective projection exist, for example, cavalier, frontal, oblique, aerial, isometric, descriptive geometric perspective, etc. Various tools make it possible to effectively manage these graphical projections such as OpenGL®.

The advantage of such projections is to be able to determine, on the basis of the same pointing toward a 3D surface, the displacement/the position of the cursor on screens tied to various viewpoints.

The projection is not necessarily orthogonal and it is possible to modify the metric according to need. For example, the displacement given by the angular velocity does not correspond to any geometric surface but is a perspective projection of the displacement onto a sphere.

The displacement of the cursor computed on the basis of the attitude (FIGS. 2a, 2b, 3c, 3a, 3b, 3c, 4a, 4b, 4c, 5a, 5b, 5c, 6a, 6b, 6c) or of the angular velocity of the pointer (FIGS. 7, 8, 9) uses the displacement and the orientation of the pointer in both cases.

As presented above, these two parameters can be determined either:

by an observation of the two pointers $p_1$ and $p_2$ (or more generally of the attitude in the form of matrices $R_1$ and $R_2$ or else in the form of quaternions $q_1$ and $q_2$);

by an observation of the angular velocity $\omega$ and of the initial attitude $R_1/q_1$ (or final attitude $R_2/q_2$).

These two procedures are therefore equivalent. Indeed, knowing $p_1$ and $p_2$ it is possible to determine the angular velocity $\omega$ assumed constant:

$$\tilde{\omega}=a\tan(p_1,p_2)*(p_1 \wedge p_2)/dt$$

Where $\wedge$ is the vector product and dt is the time interval.

Conversely, being given $\tilde{\omega}(t)$ and the initial attitude $R_1/q_1$ (resp. final attitude $R_2/q_2$), it is possible to determine the initial pointer $p_1$ (resp. final pointer $p_2$). For example, for $\tilde{\omega}$ constant for a time interval dt, a rotation of the pointer $p_1$ by an angle $\|\tilde{\omega}\|dt$ about the axis $\tilde{\omega}$ (resp. $p_2$ by an angle $-\|\tilde{\omega}\|dt$) it is possible to determine $p_2$ (resp. $p_1$)

$$p_2=q_\omega(t)\odot p_1\odot \tilde{q}_\omega(t) \text{ resp. } p_1=\tilde{q}_\omega(t)\odot p_2\odot q_\omega(t).$$

In all the embodiments described hereinabove, the control of the cursor is computed in relative mode. It is also possible to control the cursor in absolute mode according to the principles indicated as commentary to FIG. 1 and detailed hereinbelow.

In certain cases, it is possible to control the cursor of a screen by using the direct coordinates of the screen. The screen is then mapped in a two-dimensional frame of reference, using for example cartesian coordinates $(O_E,X_E,Y_E)$, cylindrical coordinates $(O_E,\varphi_E,Y_E)$, or spherical coordinates $(O_E,\varphi_E,\theta_E)$, or other systems of coordinates.

The choice of the coordinate system depends essentially on the nature of the surface of the pointed-at screen, so as to facilitate the mapping of the cursor.

By way of example:
A plane surface is in practice mapped by a system of 2D cartesian coordinates;
A cylindrical surface is in practice mapped by a system of 2D cylindrical coordinates;
A spherical surface is in practice mapped by a system of 2D spherical coordinates;
An arbitrary surface (defined by $f(x,y,z)=0$, or $f(p,\varphi,z)=0$, or $f(r,\varphi,\theta)=0$, etc.) is mapped by a system of coordinates $(O_E,C_x(m),C_y(m))$ where:
  $C_x(m)$ is a curve parameterized by m belonging to $f(.)=0$, for example $C_x(m)=\{f(x,y,z)=0\} \cap \{g_x(x,y,z)=z=0\}$ is the intersection of the surface with the horizontal plane;
  $C_y(m)$ is a curve parameterized by m belonging to $f(.)=0$, for example $C_y(m)=\{f(x,y,z)=0\} \cap \{g_y(x,y,z)=x=0\}$ is the intersection of the surface with a vertical plane.

The first example of an arbitrary plane is taken purely by way of illustration. Consider an arbitrary plane defined by a 2D cartesian frame $(O_E,X_E,Y_E)$ where
$O_E$ belongs to the plane and is invariant over time;
$X_E=[\cos(\alpha)\ \sin(\alpha)\ 0]^T$ is horizontal $(X_E//\text{Plane}(X_{Earth},Y_{Earth}))$;
$Y_E=[-\cos(\beta)\sin(\alpha)\ \cos(\beta)\cos(\alpha)\ -\sin(\beta)]^T$ is in a vertical plane and perpendicular to $X_E$.

To determine the coordinates of the cursor on the screen as a function of the pointer $p=[p_x\ p_y\ p_z]^T$ we use the following formulae:

$$X=\frac{(\vec{n}\cdot O_E)(p\cdot X_E)}{\vec{n}\cdot p}$$

$$Y=\frac{(\vec{n}\cdot O_E)(p\cdot Y_E)}{\vec{n}\cdot p}$$

In the case of a vertical plane, with $O_E=[G\ 0\ 0]^T$, $X_E=[0\ 1\ 0]^T$, $Y_E=[0\ 0\ -1]^T$, we obtain:

$$X=G\frac{p_y}{p_x}$$

$$Y=-G\frac{p_z}{p_x}$$

The second example of a vertical cylinder is taken also purely by way of illustration. Consider an arbitrary cylinder defined by a 2D cylindrical frame $(O_E,\varphi_E,Y_E)$ where
$O_E$ is at the center of the cylinder
$\varphi_E$ is the angle in the plane which defines the position of the cursor about the axis of the cylinder in the interval $[0\ 2\pi]$;
$Y_E=[0\ 0\ 1]^T$ is the vertical direction of the cylinder.

To determine the coordinates of the cursor on the screen as a function of the pointer $p=[p_x,p_y,p_z]^T$, we then compute:

$$\varphi=\text{atan}(p_y/p_x)$$

$$Y=G\frac{p_z}{\sqrt{p_x^2+p_y^2}}$$

Finally, the third example of a sphere is taken also purely by way of illustration. Consider an arbitrary sphere defined by a 2D spherical frame $(O_E,\varphi_E,Y_E)$ where:
$O_E$ is at the center of the sphere
$\varphi_E$ is the angle in the plane which defines the position of the cursor on the sphere about its vertical axis in the interval $[0\ 2\pi]$;
$\theta_E=[0\ 0\ 1]^T$ is the angle between the cursor and the vertical axis of the sphere in the interval $[-\pi/2\ \pi/2]$;

To determine the coordinates of the cursor on the screen as a function of the pointer $p=[p_x,p_y,p_z]^T$ we compute:

$$\varphi=\text{atan}(p_y/p_x)$$

$$\theta=\text{atan}\left(\frac{p_z}{\sqrt{p_x^2+p_y^2}}\right)$$

Once $\Delta x$ and $\Delta y$ have been determined, we have the choice to do either limited pointing or sliding pointing, such as are defined hereinbelow.

Let $R_1$ and $R_2$ be two frames tied to the earth whose origin is placed on the pointer. $R_1$ remains invariant and undergoes only the translation of the pointer, whereas $R_2$ undergoes the same rotation of the pointer as soon as the cursor tends to exit the screen.

Limited pointing consists in reproducing a pointing in $R_1$, thus the region pointed at does not vary in space.

Sliding pointing consists in reproducing a pointing in $R_2$. With this pointing the region pointed at slides in such a way that it remains facing the pointer.

$R_1$ and $R_2$ can be reinitialized at any moment.

The cursor of a PC is generally fed with input through the relative displacement. Limited pointing is then possible if and only if it is possible to recover the instantaneous position of the cursor on the screen. There are two means for recovering the coordinates of the cursor on the screen.

A first means is to sum without any error source the entire displacement of the cursor at the input of the PC, therefore:
  it is desirable to sum whole values;
  it is desirable to prohibit another pointer (for example another mouse, touch pad) from displacing the cursor.

A second means is to saturate the pointer by forcing for example $\Delta x=+\infty$, $\Delta y=+\infty$, thereby placing the cursor at the top left. The cursor is thereafter put back on the desired pixel. This second means is practical for reinitializing the pointer, but it is not practically possible to use it in continuous mode.

With limited pointing, it is desirable to have access to the absolute attitude of the pointer with no drift. The problem of drift can be reduced by a reinitialization performed from time to time. By way of example, a possible process consists in:

computing the sum of the displacement of the cursor $\Sigma\Delta x$ and $\Sigma\Delta y$ by attitude estimation;

defining the dimension of the screen by a solid angle according to the yaw and pitch;

it is desirable to reset $\Delta x$ to zero as soon as the yaw exceeds a limit, and $\Delta y$ to zero as soon as the pitch exceeds a limit; it is also possible to set $\Delta x$ and $\Delta y$ to zero as soon as one of the angles of yaw or of pitch exits its limit interval.

As soon as the attitude is again in the interval of the solid angle, so:

the pointer is reinitialized by using the angular velocity of the orientation, according to the current attitude;

the pointing is continued after having accumulated the entire computed displacement, even when the attitude (yaw and/or pitch) is outside of the limit interval ($\Sigma\Delta x$ and $\Sigma\Delta y$ are computed independently of the displacement of the cursor).

To reproduce a realistic absolute pointing on a given surface, it is desirable to ascertain the position/dimension and the inclination/orientation of this surface with respect to the pointer. The setting of these parameters can be calibrated at the start. For example, to define a plane screen, one points at the two ends of the diagonal as well as the normal to the screen. This exemplary embodiment is advantageous for video games where it is necessary to target/sight without showing the pointer on the screen.

To carry out sliding pointing such as defined above, it is desirable simply to feed the pointer with $\Delta x$ and $\Delta y$. In this case it is assumed that the region pointed at is displayed on the screen. In the case where the cursor on the screen of the PC risks spilling over from the screen, the new region pointed at will be displayed on the screen.

It is also possible, in certain cases where a drift in yaw is present (for example with an attitude unit limited to an Accelerometer and a Gyrometer), to carry out a semi-absolute pointing in which one performs a relative pointing according to the yaw ($\varphi$) and an absolute pointing according to pitch ($\theta$).

Various embodiments of the invention can be determined through the combination of the mode of determining the displacements of the cursor (by estimating the attitude or by using the angular velocity), of the mode of pointing (limited or sliding) and of the surface of displacement of the cursor (pointing toward a plane surface of given inclination in the terrestrial frame, toward a cylindrical surface or toward a sphere). These various combinations exhibit ergonomic advantages for certain applications.

Thus, absolute pointing toward a plane is particularly suited to video games. Absolute pointing toward a cylinder is very suited to the training games demanding speed and/or reflection. Absolute pointing toward a sphere may be advantageous for projection applications. The use of absolute pointing toward different surfaces may be advantageous for simulation exercises, for example for military use or to simulate the pointing of a laser spot on an arbitrary surface.

Sliding pointing toward a cylinder in which the displacement of the cursor is proportional to the rate of rotation of the pointer is particularly suited to a mouse application for PC or television remote control.

As a general rule one will combine the use of the estimation of the attitude with a limited pointing mode and the use of the angular velocity with a sliding pointing mode.

In essence we have described embodiments in which the pointer has an arbitrary position in the reference frame. This has enabled us to conduct the complete analytical computations. The use of the invention may easily be generalized when the pointer moves in said frame. It may also be advantageous to change projection surface in the course of one and the same sequence of use when the context of the latter evolves. It may also be advantageous to choose different projection surfaces according to the axis to be controlled, as has been illustrated and described in FIG. 9.

The examples described hereinabove are given by way of illustration of embodiments of the invention. They do not in any way limit the field of the invention, which is defined by the claims which follow.

The invention claimed is:

1. A method utilizing computer code instructions configured to control a cursor on a display surface using a pointer movable in space, said method comprising:

determining one or more first parameters characterizing the cursor and being chosen from a group comprising displacements, position and orientation of said cursor;

determining one or more second parameters of a frame of reference tied to the pointer, said one or more second parameters being chosen from a group comprising attitude, position and angular velocity of said frame, a vector p of the pointer being tied to said frame; and determining a rule of transformation of a said second parameter to a said first parameter by using one or more intersections of a straight line carried by said vector p with a projection surface, said projection surface being predetermined and distinct from the display surface.

2. The method of claim 1, wherein one or more of the first parameters are computed by a step of describing the projection surface established by at least one position of a point belonging to the tangent plane to said surface at the point of intersection with this surface at the point of intersection considered.

3. The method of claim 1, wherein the description of the projection surface varies as a function of the translation of the pointer or of the context.

4. The method of claim 1, wherein the projection surface belongs to the group of plane surfaces, cylindrical surfaces and spherical surfaces.

5. The method of claim 4, wherein the projection surface is a vertical plane surface and a first coordinate, respectively a first displacement, of the point is computed as being equal, within a multiplicative constant, to the tangent of the angle of yaw of the pointer, respectively to the difference of the tangents of the angles of yaw of the pointer at the end and at the start of said displacement.

6. The method of claim 4, wherein the projection surface is a vertical plane surface and a second coordinate, respectively a second displacement, of the point is computed as being equal, save for a multiplicative constant, to the ratio of the tangent of the angle of pitch to the cosine of the angle of yaw of the pointer, respectively to the difference of the ratios of the tangent of the angle of pitch to the cosine of the angle of yaw of the pointer at the end and at the start of said displacement.

7. The method of claim 4, wherein the projection surface is a vertical cylindrical surface and a first coordinate, respectively a first displacement, of the point is computed as being equal, save for a multiplicative constant, to the angle of yaw of the pointer at a point of the surface, respectively to the difference of the angles of yaw of the pointer at the end and at the start of said displacement.

8. The method of claim 4, wherein the projection surface is a vertical cylindrical surface and a second coordinate, respectively a second displacement, of the point is computed as being equal, save for a multiplicative constant, to the tangent of the angle of pitch of the pointer at a point of the surface, respectively to the difference of the tangents of the angles of pitch of the pointer at the end and at the start of said displacement.

9. The method of claim 4, wherein the projection surface is a spherical surface centered on the pointer and a first coordinate, respectively a first displacement, of the point is computed as being equal, save for a multiplicative constant, to the angle of yaw multiplied by the cosine of the angle of pitch of the pointer at a point of the surface, respectively to the difference of the angles of yaw of the pointer at the end and at the start of said displacement, multiplied by the cosine of the angle of pitch at the start of the displacement.

10. The method of claim 4, wherein the projection surface is a spherical surface centered on the pointer and a second coordinate, respectively a second displacement of the point is computed as being equal, save for a multiplicative constant, to the angle of pitch of the pointer at a point of the surface, respectively to the difference of the angles of pitch of the pointer at the end and at the start of said displacement.

11. A three-dimensional (3D) pointing device configured to control a cursor on a display surface, the pointing device comprising:
one or more of an accelerometer, a gyroscope and a magnetometer;
an access to a computing resource, said computing resource configured to execute computer code instructions characterized by a rule of transformation of one or more second parameters to one or more first parameters by using one or more intersections of a straight line carried by a vector p with a projection surface, said projection surface being predetermined and distinct from the display surface, wherein:
said one or more first parameters characterize the cursor and are chosen from a group comprising displacements, position and orientation of said cursor on the display surface;
said one or more second parameters characterize a frame of reference tied to the pointing device and are chosen from a group comprising attitude, position and angular velocity of said frame; and
the vector p of the pointer is tied to said frame of reference.

12. The pointing device of claim 11, wherein the orientation of the cursor is computed by projecting, along p on the projection surface, a vector perpendicular to vector p.

13. The pointing device of claim 11, wherein the rotation of a vector perpendicular to p is computed by projecting the integral of the angular velocity along the axis of the pointer or based on its orientation.

14. The pointing device of claim 11, wherein the computation of at least some of the first parameters is performed based on the angular velocity of the pointing device measured in the frame of the sensor, and on the attitude.

15. The pointing device of claim 14, wherein the displacement of the cursor, having two components, is computed by projecting an angular velocity vector of the pointing device, whose component along vector p tied to the pointer is set to zero, and transformed into the frame tied to the earth, onto the axes $(X_E, Y_E)$ of the frame defining the elementary surface for the current position and orientation of the pointing device, and multiplying by gain factors.

16. The pointing device of claim 14, wherein the displacement of the cursor, having two components, is computed by projecting the angular velocity vector of the pointing device expressed in the frame tied to the earth, onto the axes $(X_E, Y_E)$ of the frame defining a plane elementary surface and taken perpendicular to vector p defined by the pointing device, and multiplying by gain factors.

17. The pointing device of claim 11, wherein the pointing is carried out in absolute mode.

18. The pointing device of claim 11, wherein the pointing is carried out in relative mode.

19. The pointing device of claim 11, wherein the pointing is carried out in a relative mode in one direction and in an absolute mode in another direction.

* * * * *